United States Patent [19]

Hewitt et al.

[11] Patent Number: 4,768,803
[45] Date of Patent: Sep. 6, 1988

[54] JOINTED TOW BAR

[75] Inventors: Donald J. Hewitt; David Paterson, both of San Diego, Calif.

[73] Assignee: Hewitt Tubular Products, San Diego, Calif.

[21] Appl. No.: 50,544

[22] Filed: May 15, 1987

[51] Int. Cl.⁴ ............................................. B60D 1/14
[52] U.S. Cl. ................................ 280/462; 280/478 R; 280/480; 280/494; 280/511; 403/53
[58] Field of Search .............. 280/460 R, 462, 478 R, 280/477, 492, 493, 494, 481, 484, 490 R, 491 E, 511, 474, 292, 204, 480; 56/DIG. 14, 14.9, 15.7, 15.9, 16.3; 403/52, 53

[56] References Cited

U.S. PATENT DOCUMENTS

| 2,582,595 | 1/1952 | Leveke | 280/478 R |
| 2,703,243 | 3/1955 | Clark | 280/477 |
| 3,510,146 | 5/1970 | Hartman | 280/494 |
| 4,254,969 | 3/1981 | Martin | 280/477 |

FOREIGN PATENT DOCUMENTS 699702 11/1953 United Kingdom ............ 280/478 R

Primary Examiner—John J. Love
Assistant Examiner—Everett G. Diederiks, Jr.
Attorney, Agent, or Firm—Charmasson & Holz

[57] ABSTRACT

A jointed two bar for towing one vehicle by a second vehicle which incorporates joints in such a way as to allow folding and imprecise alignment during attachment, but a fail safe rigid structure for towing. A rotating cross bar joint on beams can be lifting out of the fixed towing position for storage or attachment but is prevented by structure from downward movement. Lateral movement of beams can also be accomplished from a pivot joint after beams are lifted out of a keyed slot. In towing position, slots and structure prevent folding movement from tensile, compression or lateral forces. When not in use, tow bar can be tipped up and folded on front of towed vehicle or removed and conveniently carried to a trunk of a vehicle.

7 Claims, 3 Drawing Sheets

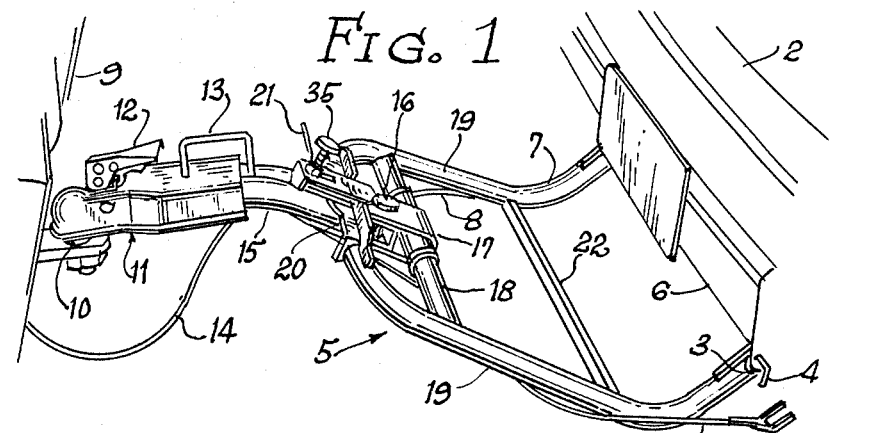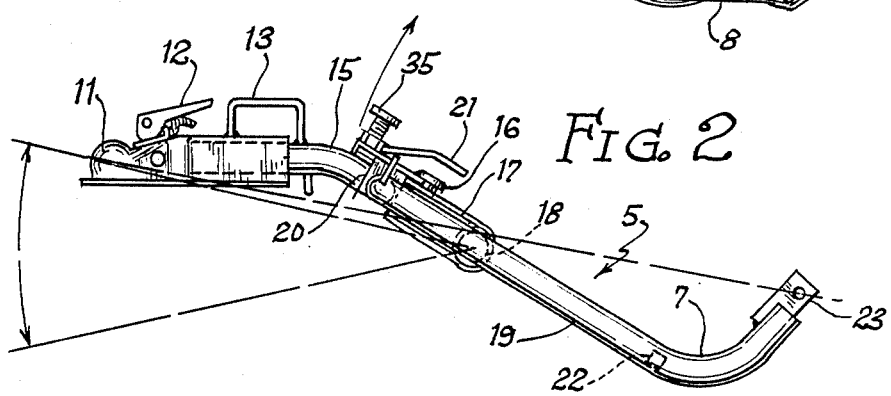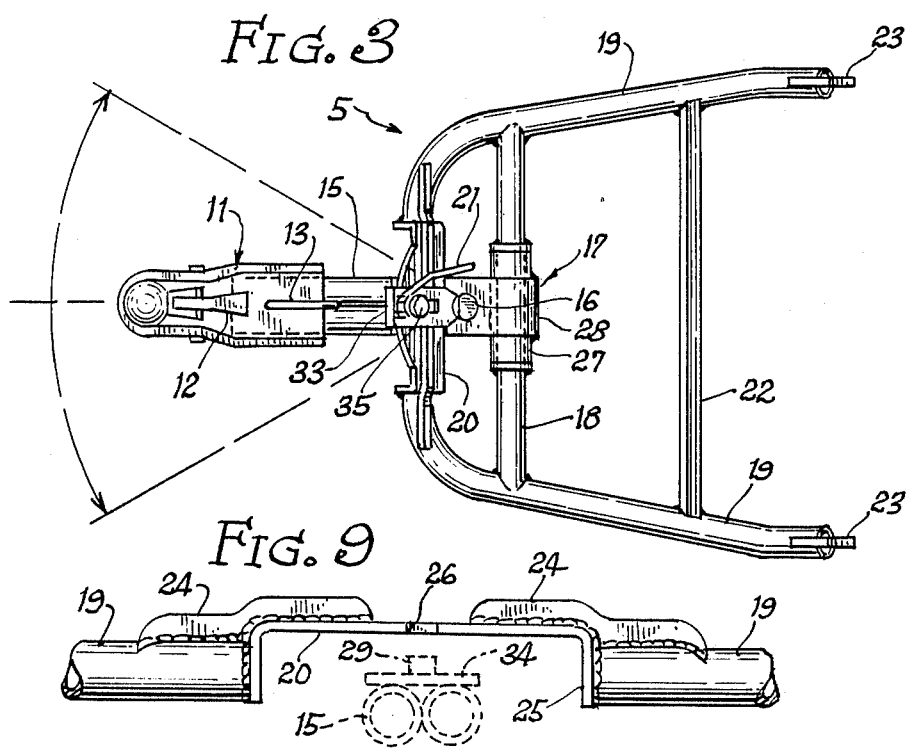

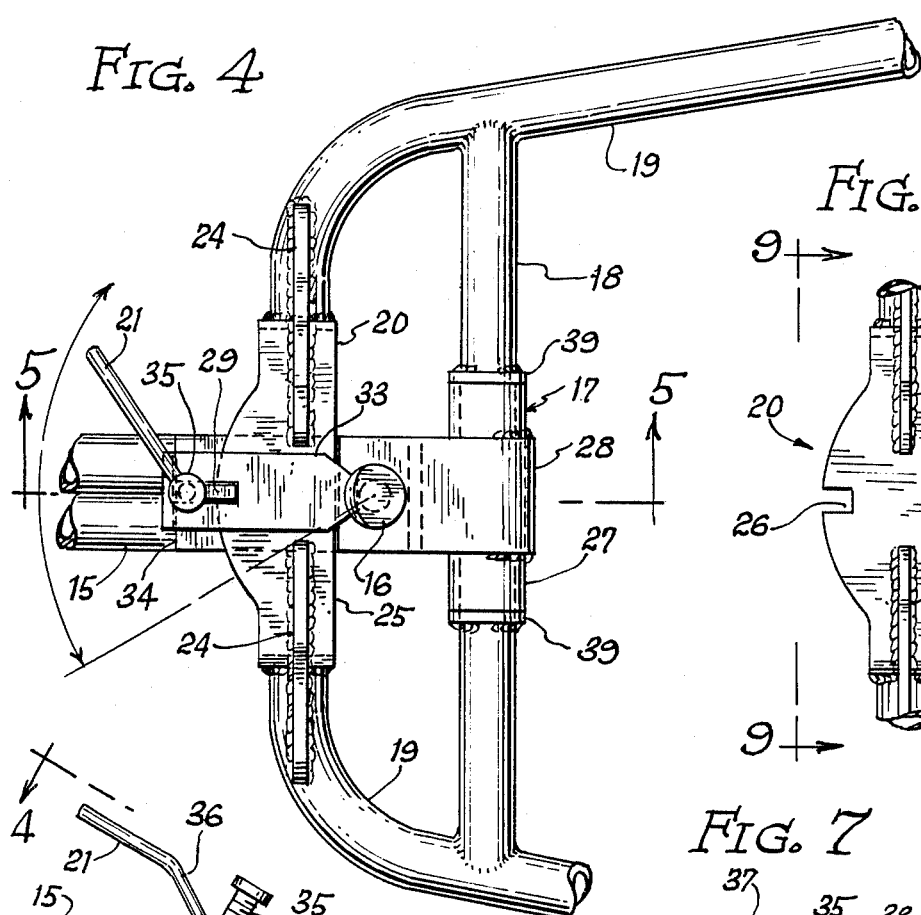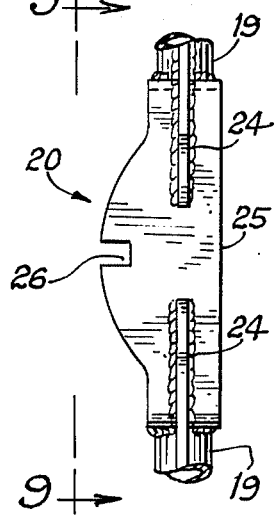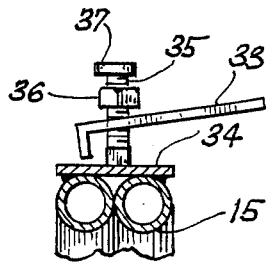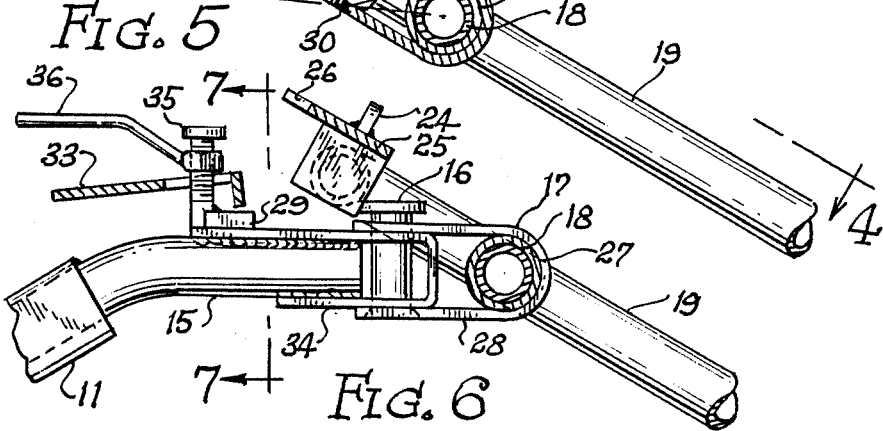

JOINTED TOW BAR

FIELD OF THE INVENTION

This invention relates to towing attachments for wheeled vehicles and more specifically to tow bars.

BACKGROUND OF THE INVENTION

A variety of towing attachments are available for towing vehicles. Simple chains, ropes and cables have been used for emergencies. These allow tensile forces to be applied (towing), but do not restrain lateral or compressive forces which can be dangerous for long distance (highway) towing. For more permanent towing uses, structural modifications to a full time towed vehicle are made, such as truck trailers and fifth wheel trailers. An inbetween area for long distance towing of predominently independent use vehicles, such as motor home towing of a sedan, a frame is bolted to the towed vehicle and a tow bar is attached. Attachment of tow bar to the frame of the towed vehicle is by means of pins allowing only up and down movement. A ball joint or hitch attaches the tow bar to the towing vehicle.

This solid tow bar and attachment allows safe highway towing. Turns, hills and bumps are accomodated while maintaining a relatively rigid attachment, not allowing dangerous oscillations or vehicle contact.

However, this tow bar arrangement also presents other problems for the user. The tow bar is difficult to attach. Both the tower and towing vehicle must be precisely aligned for attachment. This usually requires two persons, one outside and one driving one of the vehicles since attachment point is not readily visible from either vehicle's driving position. This procedure can be unpleasant in the rain, especially if excessive maneuvering is required.

In response to this problem, some tow bars include jacks, even wheeled jacks for supporting the tow bar until both vehicles are correctly aligned. Jack is then removed or lifted out of the way. However, the jack adds weight and cost, but does not eliminate the need for precise positioning.

In addition, the tow bar is difficult to store when not in use. It's length can prevent one from storing the tow bar in a vehicle's trunk. In carrying the long bar, one must also be careful not to bump or damage other equipment.

Unless the pinned connection is placed in front of bumper of towed vehicle, the tow bar cannot be left attached if vehicle is to be used independently. Even if pinned connection is in front of bumper and the tow bar left attached after tipping up, tipping up the tow bar can obstruct the view from the vehicle. Generally, pinned connection is not in front of the bumper for esthetic reasons on sedans, but is common for utility vehicles.

SUMMARY OF THE INVENTION

The principal and secondary objects of the invention are:

to provide a tow bar which can remain attached to previously towed vehicle while vehicle is driven independently;

to provide a tow bar which does not require two persons and precise positioning to attach to towing vehicle;

to provide a tow bar which can be stored in the trunk of a small vehicle;

to prepare a fail safe standard tow bar attachment between towed and towing vehicle; and to eliminate the jacking requirement of some tow bars.

DESCRIPTION OF THE PREFERRED EMBODIMENT OF THE INVENTION

These and other objects are achieved by a set of beams jointed to allow limited movement. When in the towing position, a tongue in groove design prevents lateral movement and stops prevent downward movement of the joints. Weight of the beams, normal tension or compression beams, and a clamp prevent upward movement of the joints. Upon removal of tension/compression and clamp, joint can be raised off the tongue in groove slot and stops, allowing folding of beams. Beams are also shaped to allow tip up and folding while tow bar remains attached under the front bumper of the towed vehicle. Joint also incorporates a cross bar to add further strength to tow bar.

BRIEF DESCRIPTION OF THE DRAWINGS

FIG. 1 shows a perspective view of a jointed tow bar in towing position;

FIG. 2 shows a side view of a jointed tow bar in towing position;

FIG. 3 shows a top view thereof;

FIG. 4 shows a top view of jointed portion of tow bar;

FIG. 5 shows a cross-sectional side view taken along line 5—5 of FIG. 4;

FIG. 6 is a cross-sectional side view of jointed portion of tow bar in the unclamped, partly open position;

FIG. 7 is a front cross-sectional view of clamp portion taken along line 7—7 of FIG. 6;

FIG. 8 is a top view of structural extension member;

FIG. 9 is a side view of structural extension member;

DESCRIPTION OF THE PREFERRED EMBODIMENT OF THE INVENTION

Figure 10:
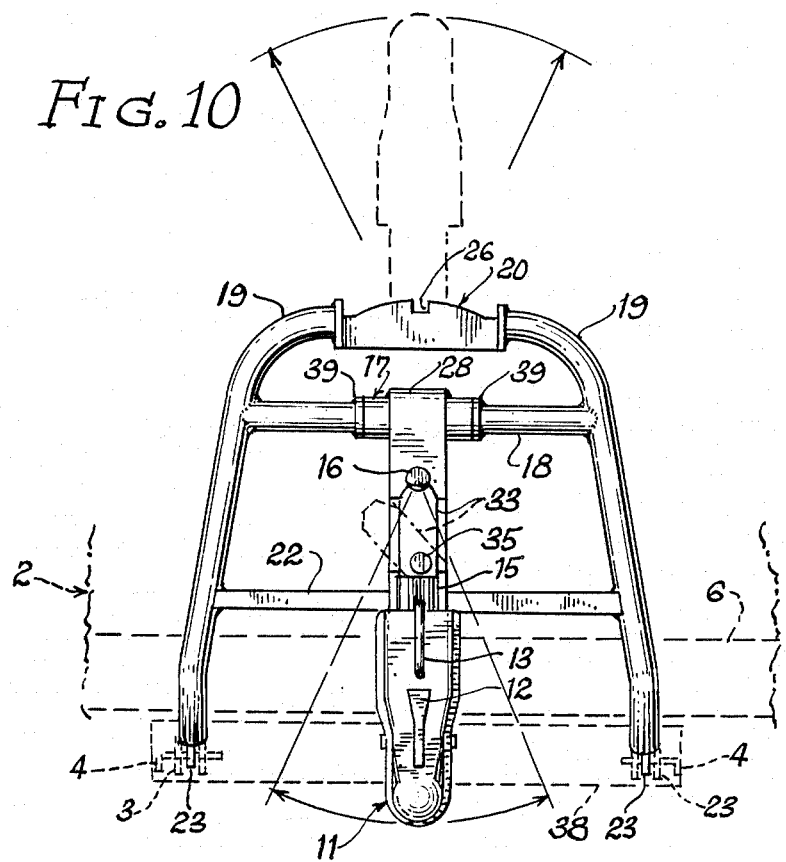
FIG. 10 is a front view of a folded tow bar.

Referring now to the drawings, FIG. 1 is a perspective view of the extended jointed tow bar. Vehicle 9 is the towing vehicle. Attach ears 3 are connected to the frame of vehicle 2. Pin 4 is used to attach joined tow bar 5 to vehicle attach ears 3. Pin 4 is located underneath and behind front bumper 6 of the towed vehicle approximately fifteen centimeters (six inches) from the ground. A bend 7 in the tow bar 5 proximate to the front bumper allows the tow bars 5 to be tipped up to a nearly vertical position without contacting the front bumper 6. Two primary safety cables 8 are shown attaching to bar 5 and to towed vehicle 2.

Towing vehicle 9 is shown with ball type hitching attachment 10 protruding. Tow bar 5 attaches to the ball 10 with a matching hitch 11. Hitch 11 includes a release handle 12 and carrying handle 13. A secondary safety cable or chain 14 connects towing vehicle 9 to the tow bar 5.

The jointed tow bar 5 consists of a pair of first beams 15 attached to hitch 11 and a pivot pin 16. Pivot pin 16 allows lateral side to side movement of first beams 15. Pivot pin 16 is supported by short structural member 17 which includes a cylindrical tube rotatably mounted on tubular cross-brace 18. Rotation of short structural member 17 allows vertical downward motion of first beams 15. Tubular cross brace 18 is attached to second beams 19 which are attached to pins 4.

Upward motion of first beams 15 relative to second beams 19 is prevented by structural extension yoke 20 which span the forward ends of second beams 19 above first beams 15. Clamp 21 holds first beams 15 fixed with respect to second beams 19 in the towing position shown. Second brace 22 is attached to second beams 19.

FIG. 2 shows a side elevation of the jointed two bar in the towing position. Bend 7 in second beams 19 provide clearance for bumper in tow bar tipped up position. Tow bar lug 23 matches the vehicle attach ears 3 and pin 4 shown in FIG. 1. Tubular cross brace 18 (shown dotted) provides support for rotatable short structural member 17, with a partial downward rotation position shown dotted. Upward rotation (shown as arrow above clamp 21) of the entire tow bar is around pins 4 (not shown for clarity). Yoke 20 prevents upward movement of first beams 15 with respect to second beams 19. Hitch 11 again includes release 12 and handle 13 and is attached to first beams 15. In this towing condition (extended), tubular brace 18 is below the plane connecting lugs 23 and hitch 11.

A top view of jointed tow bar is shown in FIG. 3. Second beams 19 are secured to each other by tubular cross brace 18, second brace 22, and structural yoke 20. Rotating structural member 17 is mounted over tubular cross brace 18, holding pivot pin 16. First beam 15 is rotatably attached to pivot pin 16, with the field of lateral travel shown dotted with arrows. Trailer hitch 11 is shown attached to first beam 15. Clamp 21 holds first beam preventing relative movement beams in the towing position.

FIG. 4 is a top view of the jointed portion of the tow bar. Second beams 19 are shown secured to each other by tubular cross brace 18 and structural yoke 20. Structural yoke 20 consists of a pair of ribs 24 and plate 25 welded to each other and to the ends of second beams 19. Plate 24 is directly on top of first beam 15 and includes a slot 26.

Short structural member 17 is composed of collar 27 and U-band 28. U-band holds pivot pin 16 in place, which allows first beams 15 to move laterally, if not clamped by clamp 21. Clamp 21 holds key 29 in slot 26.

FIG. 5 is a cross-sectional side view of the jointed portion. U-band 28 is attached to collar 27 which rotates in the direction of the arrow (downward) when not towing and/or attached by clamp 21. U-band 28 holds pivot pin 16 which includes an attach foot 30, gap 31, and head 32. First beams 15 are attached to adaptor 34 which is rotatably mounted on pivot pin 16. Adaptor 34 includes a welded key 29. Clip 33 is held in place over key 29 and slot 26 by clamp 21, which consists of a threaded shaft 35 and threaded clamp handle 36. Clip 33 fits in gap 31 and under threaded clamp handle 36.

FIG. 6 shows a side sectional view of jointed portion in the unclamped position. First beam 15 is rotated down with respect to second beam 19 around tubular brace 18. Moving with first beam 15 are adaptor 34, pivot pin 16, and short structural member 17. Clamp handle 36 has been rotated on threaded shaft 35 up to allow clip 33 out of gap 31 and away from key 29. This now also allows first beams 15 to rotate laterally around pivot pin 16.

FIG. 7 is a cross section of clamp portion. Threaded shaft 35 is welded at one end to the top of adaptor 34 which is welded to first beams 15. Nut portion of clamp handle 36 engaging threaded shaft 35 and clip 33 are shown in the unclamped position, with clip 33 rotated out of the way. Top retainer 37 prevents loss of clamp handle 36 or clip 33.

FIG. 8 is a top view of structural extension member 20, which is attached to second beams 19. Yoke 20 is composed of two ribs 24 and plate 25. Plate includes a slot 26.

FIG. 9 is a side view of structural extension yoke 20, which is attached to the ends of second beams 19. Ribs 24 are bent to follow the contour of beams 19 and plate 25 and then welded. Plate 25 is bent to provide a channel directly over first beams 15 (shown dotted prior to clamping for clarity). Slot 26 is placed directly over key 29 (shown dotted for clarity) attached to adaptor 34.

FIG. 10 shows a front view of the jointed tow bar in a folded stow position, but still attached to the towed vehicle. Towed vehicle 2 (shown dotted for clarity) includes attach ears 3, bumper 6 and pins 4. Attach ears are typically provided by a base which is plate 38, bolted or welded to the frame of the towed vehicle (shown dotted for clarity). First beam 15 is swung against second brace 22 around tubular brace 18. A pair of stops 39 are welded on tubular brace 18 to prevent translation motion of short structural member 17 which rotates on tubular brace 18.

In the stowed position, clip 33 is held against pivot pin 16 (to restrain motion) by clamp handle 36. When unclamped, clip 33 and swing of first beams 15 is shown dotted for clarity. Swing arc is limited by ends of second beams 19.

Figure 11:
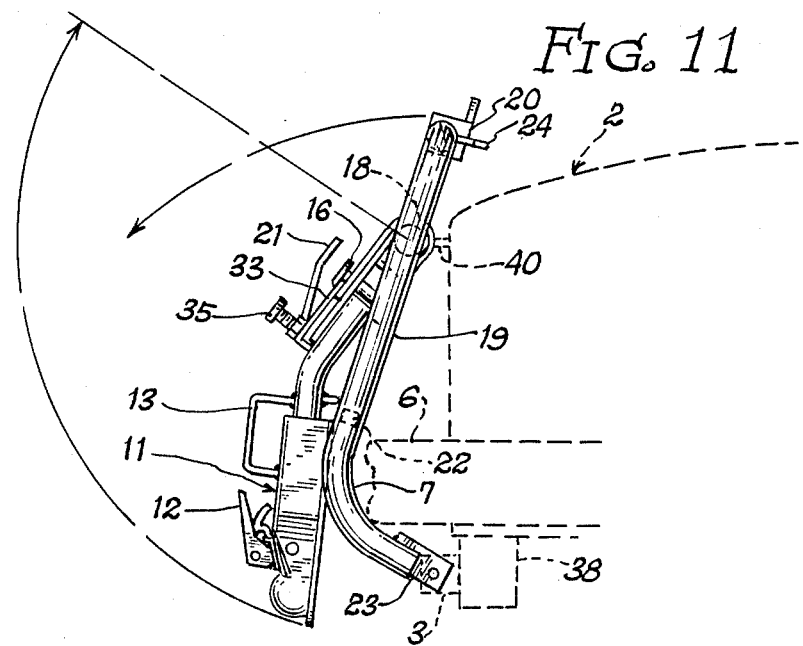
FIG. 11 is a side view of a folded tow bar.

FIG. 11 is a side view of the jointed tow bar in the folded and stowed position. Towed vehicle 2, ears 3, base plate 38 and bumper 6 are all shown dotted for clarity. Tow bar is shown attached to towed vehicle 2 with a fitting 40 which is attached to the front grill of vehicle 2. This fitting holds second beams 19 in the tipped up position while allowing first beams 15 to fold down. Additional restraints attached to bumper or frame are also possible.

To attach tow bar from stowed position (shown in FIG. 11) to towing vehicle, clamp 21 is loosened and fitting 40 is released from the grill while holding handle 13. Handle 13 then allows movement forward and laterally as much as approximately 0.6 meters (two feet) to place hitch 11 on the ball of the towing vehicle (not shown for clarity in this view). Towing vehicle is then pulled forward or towed vehicle is pushed back until key 29 (shown in FIGS. 4, 5 and 6) mates with groove 26 (shown in FIGS. 4, 8 and 9). This key in groove design prevents all further lateral relative movement when hitch 11 is attached. All relatively vertical movement when hitch 11 is attached is prevented by placement of tubular brace below the centerline connecting ears 3 with hitch 11 (shown in FIG. 2) and structural extension yoke 20. Because of brace 18 placement, compression forces further seat yoke 20, tension forces maintain position and gravity hold in joint place under other loading conditions. Clamp 21 and clip 33 provide additional security to the inherently fail safe rigid design under towing loads.

Rotation around tubular brace 18 and pivoting around pin 16 provides a form of universal joint allowing 2 degrees of freedom movement. However, movement is limited by yoke 20 and brace 18.

While the preferred embodiment of the invention has been described, other embodiments and configurations may be devised without departing from the spirit of the invention and the scope of the appended claims.

What is claimed is:

1. A jointed tow bar for attaching a towed vehicle to a towing vehicle which comprises:
   a first beam;
   a means to pivotally attach one end of said first beam to said towing vehicle;
   a cylindrical bore with a vertical axis at the remaining end of said first beam;
   a pivot pin placed in said cylindrical bore of said first beam;
   a structural member attached at one end to said pivot pin in a manner which allows movement of said structural member in one plane with respect to said first beam;
   a first tubular member with tube wall attached to the remaining end of said structural member with tubular axis in said plane of movement;
   a second tubular brace member inserted within said first tubular member, said second tubular member extending beyond the ends of said first tubular member, with an interface allowing relative rotation between said tubular members;
   a pair of second beams attached nearly perpendicular to the ends of said second tubular brace member;
   a means to pivotally attach one of the ends of said second beams to said towed vehicle at a point below the front of said vehicle; and
   a releasable means to restrain movement of said first beam relative to said second beams, releasably attaching said first beam to said second beams.

2. The tow bar as claimed in claim 1, wherein said means to restrain movement comprises:
   a structural extension member attached to both ends opposite said towed vehicle of said second beams, extending along the topside of said first beam beyond said pivot pin when both beams are in tension, which precludes vertical motion under tension or compression;
   a protruding key attached to one side of said first beam; and
   a groove in said structural extension matching said key precluding remaining relative motion under towing forces.

3. The tow bar as claimed in claim 2 which also comprises a removable clamp attached to said first beam further restraining said key within said groove on said structural extension.

4. The tow bar as claimed in claim 3 which also comprises:
   a cross brace attached between said second beams near said means to attach to said towed vehicle;
   and safety cables attached between towed vehicle and tow bars, and between towing vehicle and tow bar.

5. The tow bar as claimed in claim 4, wherein said means to attach said second beams to said towed vehicle comprises:
   a base plate attached to said towed vehicle;
   a pair of arms extending under said bumper, attached to said base plate matching said ends of said second beams;
   a cylindrical opening in each of said arms and second beam ends with each axis approximately horizontal and perpendicular to the direction of vehicle travel; and
   a pair of bolts placed through said cylindrical openings of said arms and second beams.

6. The tow bar as claimed in claim 5, wherein said means to attach said first beam to said towing vehicle consists of:
   a hitch ball attached to the rear of said towing vehicle; and
   a towing hitch attached to said first beam which mates with said hitch ball and includes a release mechanism, release handle and carrying handle.

7. The jointed tow bar as claimed in claim 6 which also comprises a bend in said second beam which allows said first beam to be raised to a nearly vertical position when attached to said towed vehicle.

* * * * *